(12) United States Patent
Winberg et al.

(10) Patent No.: US 8,937,556 B2
(45) Date of Patent: Jan. 20, 2015

(54) INDICATING THE PROGRESS OF A BOOT SEQUENCE ON A COMMUNICATION DEVICE

(75) Inventors: Michael Erik Winberg, Malmö (SE); Ryan Alexander West, Kitchener (CA); Kevin Roy Sugden, Toronto (CA)

(73) Assignee: BlackBerry Limited, Waterloo, Ontario ( * ) Notice: Subject to any disclaimer, the term of this patent is extended or adjusted under 35 U.S.C. 154(b) by 77 days.

(21) Appl. No.: 13/531,164

(22) Filed: Jun. 22, 2012

(65) Prior Publication Data

US 2013/0342544 A1    Dec. 26, 2013

(51) Int. Cl.
*G08B 5/00* (2006.01)

(52) U.S. Cl.
USPC ........ 340/815.4; 345/418; 345/659; 345/156; 700/83; 713/300

(58) Field of Classification Search
USPC ........ 340/815.4; 713/300, 320, 323; 345/659, 345/656, 643, 581, 418, 156, 502; 700/83, 700/86
See application file for complete search history.

(56) References Cited

U.S. PATENT DOCUMENTS

| | | | |
|---|---|---|---|
| 5,953,010 A | 9/1999 | Kampe et al. | |
| 7,996,792 B2 | 8/2011 | Anzures et al. | |
| 8,122,368 B2 | 2/2012 | Chakra et al. | |
| 8,144,120 B2 | 3/2012 | Vassigh et al. | |
| 2006/0020966 A1 | 1/2006 | Poslinski | |
| 2007/0022282 A1 | 1/2007 | Chang | |
| 2007/0143803 A1 | 6/2007 | Lim | |
| 2007/0150826 A1* | 6/2007 | Anzures et al. | 715/772 |
| 2008/0010516 A1* | 1/2008 | Lu | 714/15 |
| 2008/0256474 A1 | 10/2008 | Chakra et al. | |
| 2009/0070699 A1 | 3/2009 | Birkill et al. | |
| 2009/0204928 A1* | 8/2009 | Kallio et al. | 715/799 |
| 2010/0020022 A1 | 1/2010 | Russell et al. | |
| 2010/0150522 A1 | 6/2010 | Schmehl | |
| 2010/0241887 A1* | 9/2010 | Chang | 713/323 |
| 2011/0260958 A1 | 10/2011 | Shabel et al. | |
| 2012/0032945 A1* | 2/2012 | Dare et al. | 345/418 |
| 2012/0096387 A1 | 4/2012 | Fu et al. | |

OTHER PUBLICATIONS

European Patent Office, "Extended European Search Report," issued in connection with European patent application No. 12173313.3 on Nov. 2, 2012 (6 pages).
European Office Action dated Aug. 28, 2013, EP 12173313.3.

* cited by examiner

*Primary Examiner* — George Bugg
*Assistant Examiner* — Edny Labbees
(74) *Attorney, Agent, or Firm* — Hanley, Flight & Zimmerman, LLC

(57) ABSTRACT

Disclosed is a method of indicating the progress of a boot sequence on a communication device, the method comprising initiating the boot sequence; receiving input at the communication device during the boot sequence; and, in response to receiving input, outputting a progress indicator indicating the progress of the boot sequence.

16 Claims, 7 Drawing Sheets

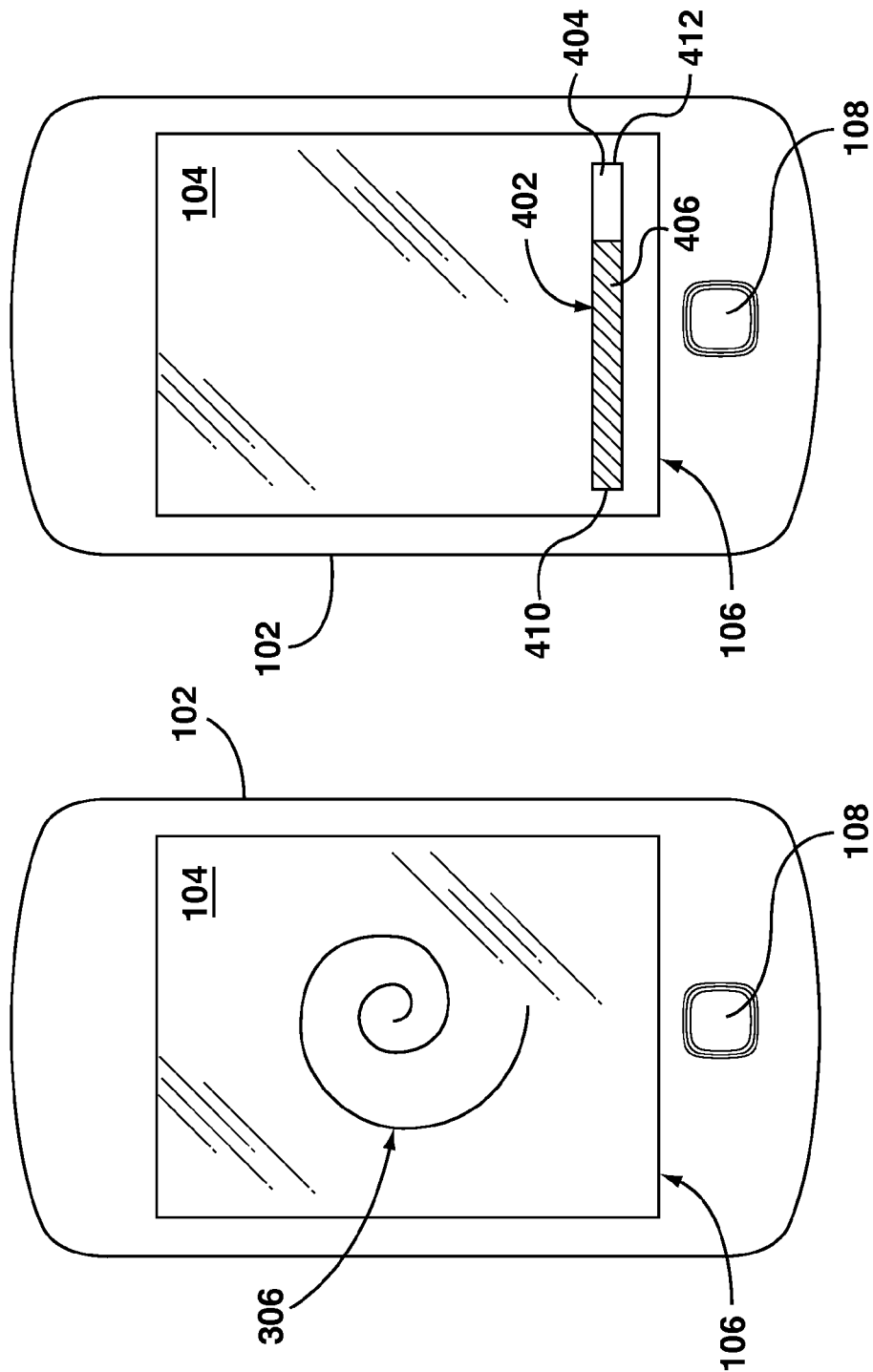

INDICATING THE PROGRESS OF A BOOT SEQUENCE ON A COMMUNICATION DEVICE

FIELD

The present matter relates to communication devices and in particular to methods and systems for indicating the progress of a boot sequence on a communication device.

BACKGROUND

Communication device such as mobile devices, cell phones, tablets or smart phones typically have boot sequences that are executed when the power to the communication device is switched on or when the battery is connected to the communication device. Often non-essential applications or processes are operating during the boot sequence. Such applications or processes consume resources from the communication device and as a consequence can slow down the boot sequence.

BRIEF DESCRIPTION OF DRAWINGS

In order that the subject matter may be readily understood, embodiments are illustrated by way of examples in the accompanying drawings, in which:

FIG. 3 is a top view of a communication device displaying an animation;

FIG. 4 is a top view of a communication device displaying a progress indicator;

DETAILED DESCRIPTION

In accordance with an aspect described is a method of indicating the progress of a boot sequence on a communication device, the method comprising: initiating the boot sequence; receiving input at the communication device during the boot sequence; and, in response to receiving input, outputting a progress indicator indicating the progress of the boot sequence.

In accordance with a further aspect, described is a communication device comprising: a memory storing boot sequence instructions; an input interface; a processor coupled to the input interface to receive input and coupled to memory to execute the boot sequence instructions to configure the processor to: receive input at the input interface; and, in response to receiving input, output a progress indicator indicating the progress of the boot sequence.

In accordance with a further aspect, described is a computer readable storage medium comprising computer-executable instructions which, when executed, cause a processor to: receive input; and, in response to receiving input, output a progress indicator indicating the progress of the boot sequence.

Example Communication Device

Figure 1:
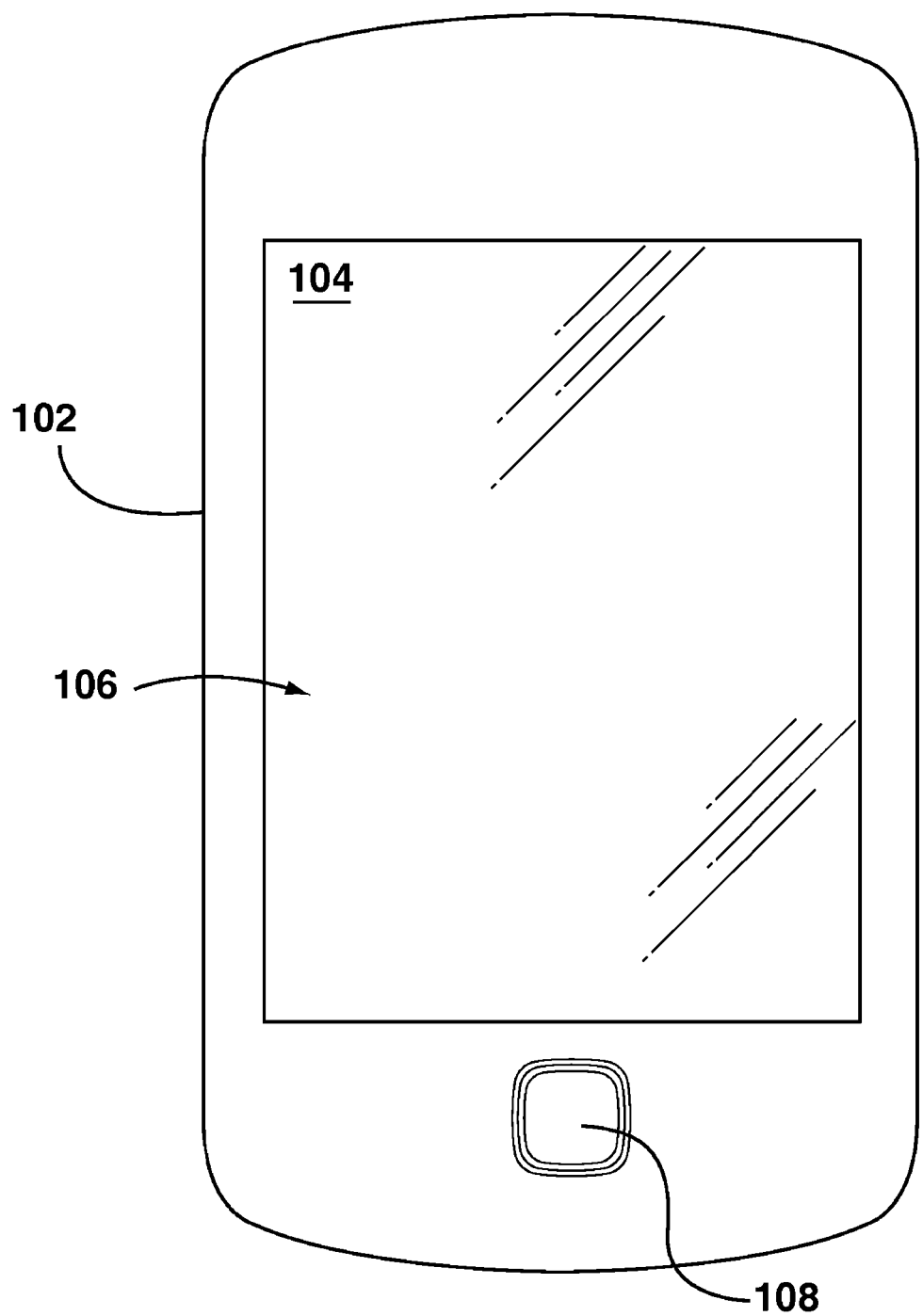
FIG. 1 is a top view of a communication device.

An exemplary communication device 102 is shown in FIG. 1. The communication device 102 has an activation button 108 and a display 106 with a front surface 104. The activation button can be pressed to activate a selection on an interface on the display 106 and may also be operable to move a cursor around the interface on the display 106. The interface can be a graphical user interface. It is understood that other types of input mechanisms can be used in additional to or as an alternative to the activation button 108, such as a trackball or a touchpad. In one or more embodiments, the activation button 108 is operable to initiate or to provide power to the communication device 102. For example, if the communication device 102 is powered off and the activation button 108 receives input (e.g. it is pressed) a boot up sequence is initiated in the communication device 102 to initiate the operating system. In a further embodiment, there is a separate power button located on the communication device 102 which, when selected, turns on or powers on the communication device 102. It is understood that there may be other ways to turn on a communication device 102, such as by pressing and holding one or more buttons on the communication device 102 simultaneously for a predetermined period of time. There may be one or more additional buttons or input components on or associated with the communication device 102 that are not shown in the illustrations.

Figure 2:
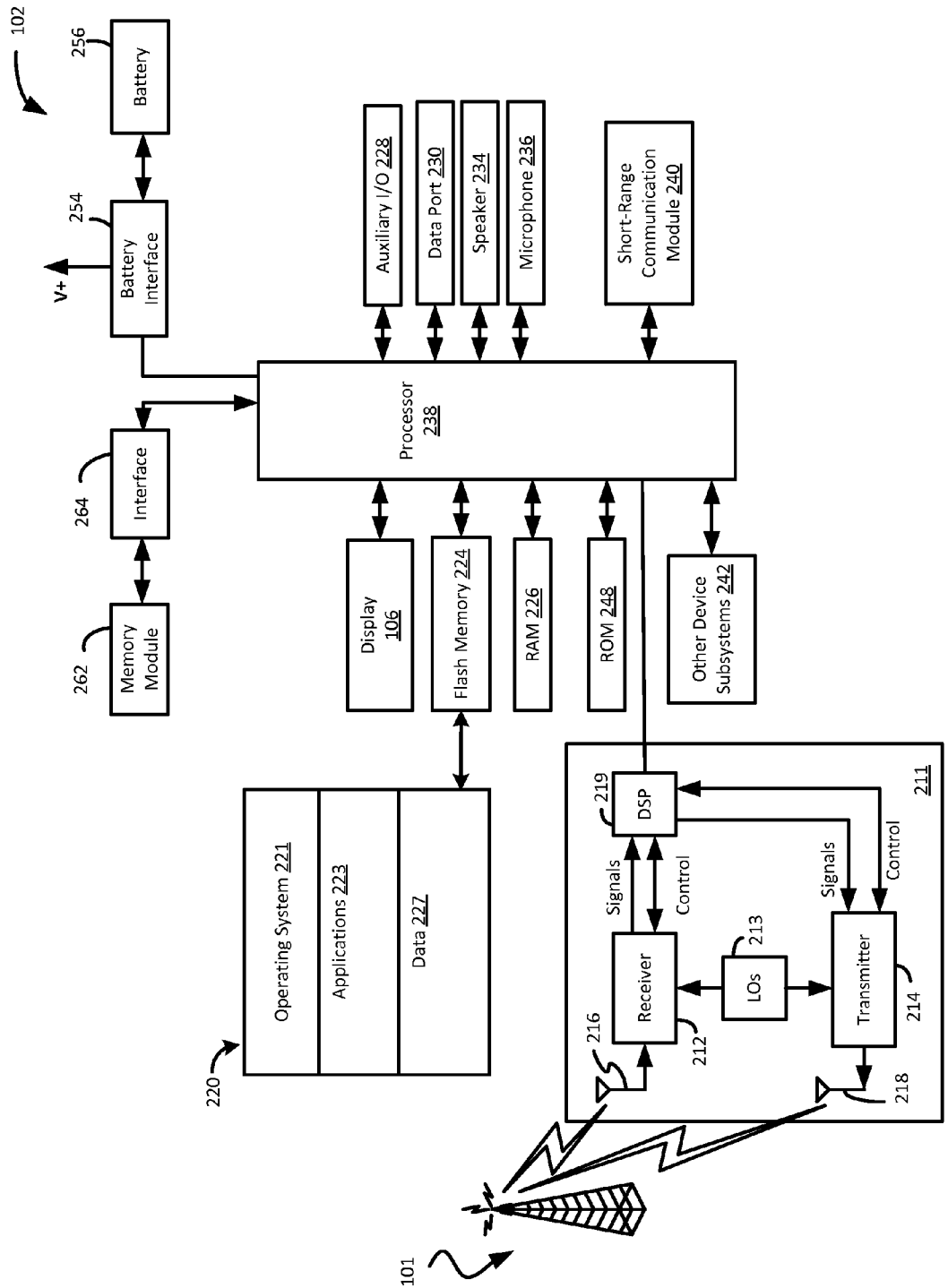
FIG. 2 is a block diagram illustrating components of a communication device.

Referring to FIG. 2, a typical communication device 102 is illustrated in greater detail. The communication device 102 is often a two-way communication device having both voice and data communication capabilities, including the capability to communicate with other computer systems. Depending on the functionality provided by the communication device 102, it may be referred to as a data messaging device, a two-way pager, a cellular telephone with data messaging capabilities, a wireless Internet appliance, a smartphone, a table computer, or a data communication device, for example.

The communication device 102 includes a processor 238, which controls general operation of the communication device 102. The processor 238 can interact with additional device subsystems such as a display 106, a flash memory 224, a random access memory (RAM) 226, a read only memory (ROM) 248, auxiliary input/output (I/O) subsystems 228 (such as a keyboard or trackball, for example), a data port 230, a speaker 234, a microphone 236, a short-range communication module 240 such as Bluetooth® for example, and any other device subsystems or peripheral devices generally designated at 242. The processor 238 interacts with other device subsystems such as a wireless communication subsystem 211 for exchanging radio frequency signals with a wireless network 101 to perform communication functions. Some of the subsystems shown in FIG. 2 perform communication-related functions, whereas other subsystems may provide "resident" on-device functions.

The communication device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 219. As will be apparent to those skilled in field of communications, the particular design of the communication subsystem 211 depends on the wireless network 101 in which the communication device 102 is intended to operate.

Operating system software used by the processor 238 may be stored in a persistent store such as the flash memory 224 (which may be a ROM), a ROM 248 or similar storage element (not shown). The operating system 221, specific device applications, or parts thereof, may be temporarily loaded into a volatile store such as RAM 226.

The processor 238, in addition to its operating system functions, enables execution of software applications on the communication device 102. A predetermined set of applications, which control basic device operations, is installed on the communication device 102 during its manufacture. These basic operations typically include data and voice communication applications, for example. Additionally, applications may also be loaded onto the communication device 102 through the network, an auxiliary I/O subsystem 228, data port 230, short-range communication module 240, or any other suitable subsystem 242, and installed by a user in RAM 226, ROM 248 or flash memory 224, for execution by the processor 238. Such flexibility in application installation increases the functionality of the communication device 102 and may provide enhanced on-device features, communication-related features, or both.

The short range communication module 240 provides for communication between the communication device 102 and different systems or devices, which need not be similar devices.

For example, the short range communication module 240 may include an infrared device and associated circuits and components, or a wireless bus protocol compliant communication mechanism such as a Bluetooth® communication module to provide for communication with similarly-enabled systems and devices.

The display 106 is used to visually present an application's graphical user interface (GUI) to the user. The user can manipulate application data by modifying information on the GUI using an auxiliary input/output device, such as a keyboard for example. Depending on the type of communication device 102, the user may have access to other types of input devices, such as, for example, a scroll wheel, trackball, light pen or touch sensitive screen (e.g. a touchscreen display).

The communication device 102 may include a touchscreen display in some example embodiments. The touchscreen display may be constructed using a touch-sensitive input surface connected to an electronic controller. The touch-sensitive input surface overlays the display and may be referred to as a touch-sensitive overlay. The touch-sensitive overlay and the electronic controller provide a touch-sensitive input interface and the processor 238 interacts with the touch-sensitive overlay via the electronic controller. That is, the touchscreen display acts as both an input interface and an output interface.

In some example embodiments, the auxiliary input/output (I/O) subsystems 228 may include an external communication link or interface, for example, an Ethernet connection. The communication device 102 may include other wireless communication interfaces for communicating with other types of wireless networks; for example, a wireless network such as an orthogonal frequency division multiplexed (OFDM) network.

In some example embodiments, the communication device 102 also includes a removable memory module 262 (typically including flash memory) and a memory module interface 264. Network access may be associated with a subscriber or user of the communication device 102 via the memory module 262, which may be a Subscriber Identity Module (SIM) card for use in a GSM network or other type of memory module for use in the relevant wireless network type. The memory module 262 may be inserted in or connected to the memory module interface 264 of the communication device 102.

The communication device 102 may store data 227 in an erasable persistent memory, which in one example embodiment is the flash memory 224. In various example embodiments, the data 227 may include service data having information required by the communication device 102 to establish and maintain communication with the wireless network 101. The data 227 may also include user application data such as email messages, address book and contact information, calendar and schedule information, notepad documents, images, and other commonly stored user information stored on the communication device 102 by its user, and other data.

In some example embodiments, the communication device 102 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their communication device 102 to the host computer system via a USB cable or Bluetooth® connection, traffic that was destined for the wireless network 101 is automatically routed to the communication device 102 using the USB cable or Bluetooth® connection. Similarly, any traffic destined for the wireless network 101 is automatically sent over the USB cable Bluetooth® connection to the host computer for processing.

The communication device 102 also includes or is connected to a power source such as a battery 256, which may be one or more rechargeable batteries that may be charged, for example, through charging circuitry coupled to a battery interface 254 such as the serial data port 230. The battery 256 provides electrical power to at least some of the electrical circuitry in the communication device 102, and the battery interface 254 provides a mechanical and electrical connection for the battery 256. The battery interface 254 is coupled to a regulator (not shown) which provides power V+ to the circuitry of the communication device 102.

A predetermined set of applications that control basic device operations, including data and possibly voice communication applications may be installed on the communication device 102 during or after manufacture. Additional applications and/or upgrades to an operating system 221 or software applications 223 may also be loaded onto the communication device 102 through the wireless network 101, the auxiliary I/O subsystem 228, the data port 230, the short range communication module 240, or other suitable device subsystems 242. The downloaded programs or code modules may be permanently installed; for example, written into the program memory (e.g. the flash memory 224), or written into and executed from the RAM 226 for execution by the processor 238 at runtime.

In some example embodiments, the communication device 102 may provide two principal modes of communication: a data communication mode and a voice communication mode. In the data communication mode, a received data signal such as a text message, an email message, or webpage download will be processed by the communication subsystem 211 and input to the processor 238 for further processing. For example, a downloaded webpage may be further processed by a web browser or an email message may be processed by the email messaging application and output to the display 106. A user of the communication device 102 may also compose data items, such as email messages; for example, using an input interface in conjunction with the display 106. These composed items may be transmitted through the communication subsystem 211 over the wireless network 101.

In the voice communication mode, the communication device 102 provides telephony functions and may operate as a typical cellular phone. The overall operation is similar to the data communication mode, except that the received signals would be output to the speaker 234 and signals for transmission would be generated by a transducer such as the microphone 236. The telephony functions are provided by a combination of software/firmware (i.e., a voice communication module) and hardware (i.e., the microphone 236, the speaker 234 and input devices). Alternative voice or audio I/O subsystems, such as a voice message recording subsystem, may also be implemented on the communication device 102. Although voice or audio signal output may be accomplished primarily through the speaker 234, the display 106 may also be used to provide an indication of the identity of a calling party, duration of a voice call, or other voice call related information.

The processor 238 operates under stored program control and executes software modules 220, such as applications 223, stored in memory such as persistent memory; for example, in the flash memory 224. As illustrated in FIG. 2, the software modules 220 may include operating system software and one or more additional applications 223 or modules. The processor 238 may also operate to process data 227 stored in memory associated with the communication device 102.

Exemplary Boot Sequence

A boot sequence is a set of instructions stored on memory of the communication device 102 that is executed by the processor 238 when the communication device 102 is turned on from a powered off state. In a powered off state the operating system 221 and other software modules 220 on or associated with the communication device 102 may not be receiving power and may therefore not be operable. Similarly, in accordance with an embodiment, in a powered off state the processor 238 is not executing any instructions. In one or more exemplary embodiments, the communication device 102 and/or the processor 238 may be receiving only minimal power in the powered off state but not enough power to operate with normal working functionality. The communication device 102 may be turned on by providing power to the processor 238 and instructing the processor 238 to initiate or run the boot sequence. Turning the communication device on 102 may be performed by selecting the activation button 108. In accordance with an embodiment, the communication device 102 may have a separate power button which when pressed or selected provides power to the processor (and one or more other components) and instructs the processor 238 to initiate the boot sequence. In other embodiments, the communication device 102 may be turned on or initiated by another input such as voice or through a touchscreen display or by selecting one or more buttons associated with the communication device 102 for a predefined period of time.

The boot sequence can comprise a power-on self-test (or POST) routine that runs immediately after a communication device 102 is powered on. The POST routine can initialize the internal signals and ensure that the communication device 102 is operational. For example, the POST routine can run internal predetermined tests or diagnostics to verify whether certain processes and/or applications associated with the communication device 102 are operational. If the POST routine identifies a failure, it causes a message to be output from the communication device 102 (e.g. on the display 106 or by an audible message) and can also cause the remainder of the boot sequence code to not execute. The remainder of the boot sequence includes code that, when executed, initializes the operating system and select processes, launches any essential applications and prepares the communication device 102 for normal operation. For example, the boot sequence locates and loads the operating system 221 instructions into RAM 226 for execution by the processor 238. Similarly, other essential or selected process can be located and loaded into RAM 226 for execution by the processor 238. In one or more embodiments, the boot sequence may also initiate (i.e. locate and load) a boot loader, which is a computer program that can load the main operating system or runtime environment after the POST routine is complete. The boot sequence code often takes between 30 and 120 seconds to complete on a communication device 102, for example. Upon completion of the boot sequence the operating system is then configured to receive input and operate applications, and the processor 238 is then configured to execute instructions stored in memory. The boot sequence code may conclude with a signal or indication to the processor 238 that the boot sequence is complete.

In accordance with one or more embodiments, the boot sequence code is stored or installed in memory during the manufacture of the communication device 102. For example, the boot sequence may comprise a set of predetermined applications or processes that are programmed into memory during the initial manufacturing and calibration of the communication device 102. By way of further example, the boot sequence may be stored on an integrated circuit read only memory that is in communication with or associated with the processor 238 of the communication device 102.

Exemplary Communication Device 102 with Progress Indicator

FIG. 3 shows an embodiment of a communication device 102 with a display 106. The display 106 has a front surface 104 that includes an output interface. An animation 306 is output on the display 106. The animation 306 can be dynamic, such as one or more moving images or it can be a static display such as one or more still images. The animation 306 shown in FIG. 3 is a swirl design. In accordance with the illustrated embodiment, the front surface 104 includes a touchscreen display. Thus, the display 106 has both an output interface and an input interface. In accordance with one or more embodiments, the animation 306 is output on the display 106 during the boot sequence. It is understood that the animation 306 can be output during other states of the communication device 102. For example, the animation 306 can be output during normal operations of the communication device 102 (i.e. after the boot sequence has completed), the animation 306 can be output while a selected application is loading, or the animation 306 can be output in the background while a selected application is running or executing.

It is understood that outputting the animation 306 on the display 106 can be caused by the processor 238 executing instructions stored on memory associated with the communication device 102. In accordance with an embodiment, instructions causing the processor to output the animation 306 on the display 106 during the boot sequence may be installed on the communication device 102 during its manufacture.

FIG. 4 shows an embodiment of the communication device 102 with a progress indicator 402 output on the display 106. The progress indicator 402 can be output on the display 106 during the boot sequence, for example. The progress indicator 402 provides an indication of the progress of the boot sequence. For example, in the embodiment depicted in FIG. 4, the progress indicator 402 is a rectangle, has a shaded portion 406 and a transparent or non-shaded portion 404. The amount of space in the rectangle that includes the shaded portion 406 in comparison to the non-shaded portion 404 is representative of the amount of time elapsed in the estimated time to completion of the boot sequence. For example, the shaded portion 406 progresses from a first side 410 of the progress indicator 402 to a second side 412 while the boot sequence is operating. The amount of the progress indicator 402 that is filled in by the shaded portion 406 can be proportional to the amount of time that has elapsed out of the estimated time to complete the entire boot sequence.

In accordance with one or more alternative embodiments, the progress indicator 402 indicates how much of the operating system has been loaded into memory 224 of the communication device 102. For example, the progress indicator 402 in FIG. 4 could be indicating of the percentage of the operating system that is loaded into memory 224. In such an embodiment, the shaded portion 406 progresses from the first side 410 of the progress indicator 402 to the second side 412 of the progress indicator while the boot sequence is loading the operating system 224. The amount of the progress indicator 402 that is filled in by the shaded portion 406 can then be proportional to the amount or percentage of the operating system that has been loaded out of the total amount of the operating system that is loaded during the boot sequence. The amount or percentage of the operating system that has been loaded can be determined by the processor evaluating the progress of the boot sequence, for example. In a further exemplary embodiment, the percentage of the operating system that has been loaded could be translated into units of time and the progress indicator 402 could display the time elapsed out of the boot sequence and the remaining time until completion of the boot sequence as described above.

It is understood that the progress indicator 402 can be different in shape and form from the embodiment depicted in FIG. 4. For example, the progress indicator 402 can be a circle that gradually fills in, or it can be an audible message output on an output interface other than the display 106 (e.g. audibly outputting the time remaining until the boot sequence is complete).

It is understood that outputting the progress indicator 402 can be caused by the processor 238 executing instructions stored on memory associated with the communication device 102. For example, the processor 238 can determine the progress of the boot sequence or can determine at what stage (or at what step) the boot sequence is in. In response to this determination the processor 238 can estimate the time elapsed until the completion of the boot sequence and can update the shaded portion 406 of the progress indicator 402 to reflect the estimated remaining time in the boot sequence or, similarly, the processor 238 can update the progress indicator 402 to indicate the progress of the boot sequence.

Figure 5:
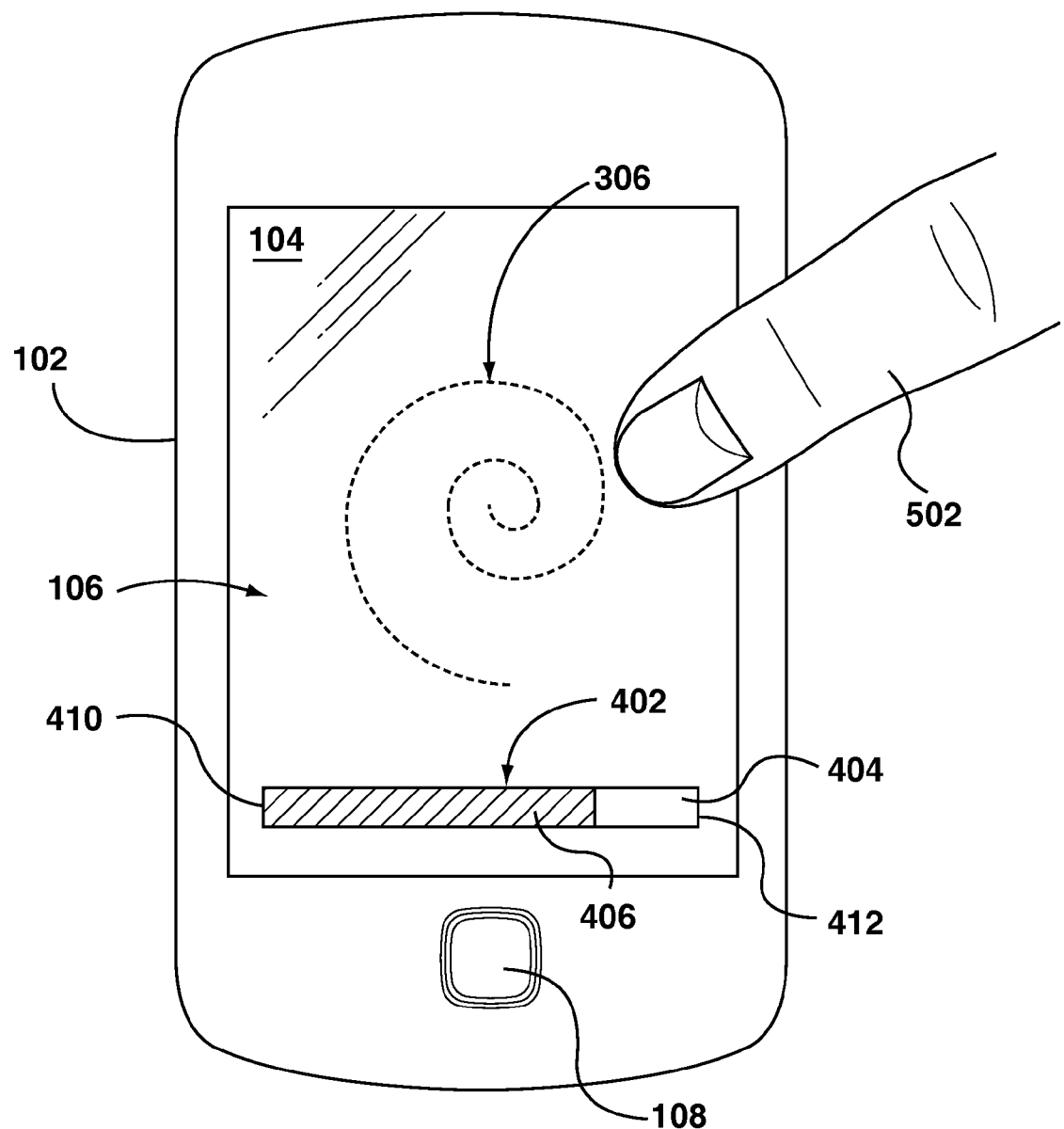
FIG. 5 is a top view of a communication device receiving input.

In accordance with an embodiment, the progress indicator 402 and the animation 306 are displayed simultaneously, as shown in the exemplary display 106 in FIG. 5. In FIG. 5 a finger 502 is touching the touchscreen display, the progress indicator 402 is prominently output on the display 106 and the animation 306 (shown in dashed lines) is faded or shown less prominently on the display 106. The touch on the touchscreen surface 104 by the finger 502 is an example of an input received at the communication device 102. It is understood that other types of input are contemplated as an alternative (or together with) a touch on the touchscreen display. For example, the input could be a button selection, a trackball movement or an audible command.

In accordance with an embodiment, input is received at the touchscreen display and, in response, the processor 238 executes instructions stored on memory that cause the animation 306 to be output less prominently, to fade out or to be removed from the display 106. In response to receiving the input, the processor 238 can also execute instructions stored on memory that cause the progress indicator 402 to be prominently output (on the display 106 or otherwise). In accordance with one or more exemplary embodiments, the input causes the display 106 to transition from a state in which the progress indicator 402 is not output on the display 106 to a state in which the progress indicator 402 is output on the display 106.

In one or more embodiments, the input received at the communication device 102 lasts for a period of time. For example, the finger 502 may remain touching the touchscreen display for a period or duration of time. Or, in a further embodiment, the duration or period of time lasts as long as a button is pressed. It is understood that there are different types of input that can be received at the communication device 102 for a defined or discrete period of time. In a further embodiment, the communication device 102 receives a first input (e.g. a touch, button selection or audible command) followed by a second input (e.g. a touch, button selection or audible command). In response to the first input the processor 238 initiates the duration or period of time and in response to the second input the processor 238 stops the duration or period of time. Accordingly, the progress indicator 402 is displayed for the duration between the receipt of the first input and the receipt of the second input; similarly, the animation can be faded out (or displayed less prominently or removed from the display 106) for the duration of time between the receipt of the first input and the receipt of the second input.

In accordance with one or more embodiments, during the boot sequence and while no input is received at the communication device 102 (i.e. the processor is not within the duration of time) the animation 306 is prominently output on the display 106.

In accordance with one or more embodiments, the location on the display 106 where the progress indicator 402 is output can be dependent on the location of an input to the touchscreen display. For example, the touchscreen display may be configured to identify the approximate location on the surface 104 of a touch. In response to receiving a touch on the touchscreen display, the processor 238 can execute instructions stored on memory causing the location of the display of the progress indicator 402 to depend on the location of the touch on the surface 104 (or touchscreen display). In a further embodiment, the location on the display where the progress indicator 402 is output is adjacent to the location of the touch. More specifically, the processor 238 executes instructions stored on memory to cause the progress indicator 402 to be output on the display 106 at a location adjacent to the location of the touch.

Figure 6:
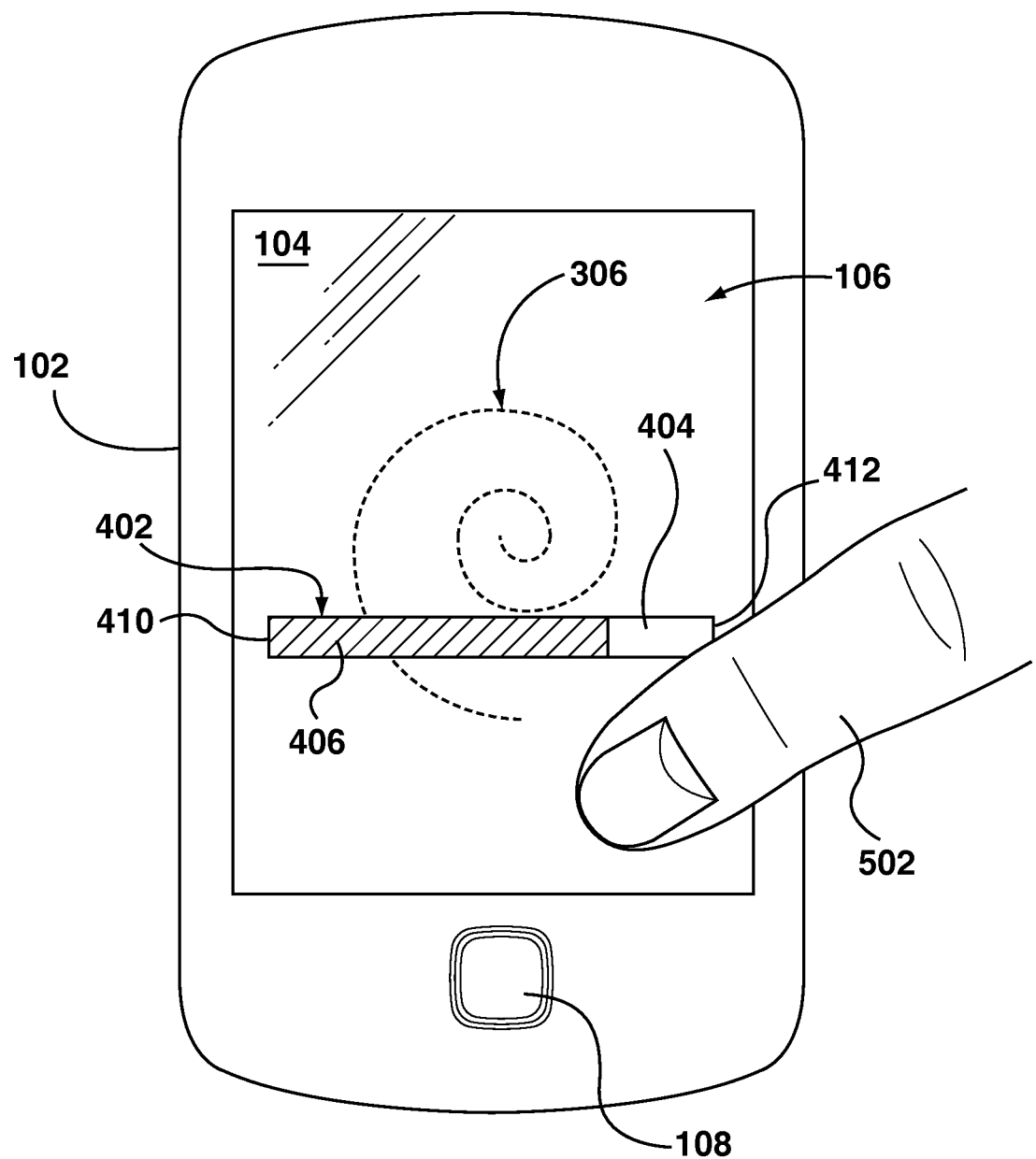
FIG. 6 is a top view of a communication device receiving input.

The communication device 102 may be associated with or include an orientation module that measures the orientation of the communication device 102. For example, the orientation module can be coupled to the processor and can be an application stored in memory that is configured to receive input from an orientation sensor such as one or more accelerometers and/or one or more gyroscopes in order to approximate the orientation of the communication device 102. The one or more accelerometers and/or the one or more gyroscopes can be located on the communication device 102 or can be housed in the communication device 102. The orientation of the communication device 102 can comprise, for example, an angle of the communication device 102 relative to the ground. The orientation module may be configured to measure and calculate whether one edge of the communication device 102 is above or higher than another edge of the communication device 102 relative to the ground. The measurements taken or calculated or determined by the orientation module can be stored in memory of the communication device 102 and may be accessible by other applications operating on the communication device 102 or otherwise in communication with the communication device 102. With reference to FIG. 6, the communication device 102 can use the orientation module or the measurements calculated by the orientation module to compare the location of a touch on the touchscreen with the location of the output of the progress indicator 402 on the display 106. In accordance with one or more embodiments, in response to receiving a touch on the touchscreen display during the boot sequence, the processor 238 may retrieve the orientation measurements from memory (or directly from the orientation module) and using the orientation measurements may cause the progress indicator 402 to be output on the display 106 above the location of the touch.

Figure 7:
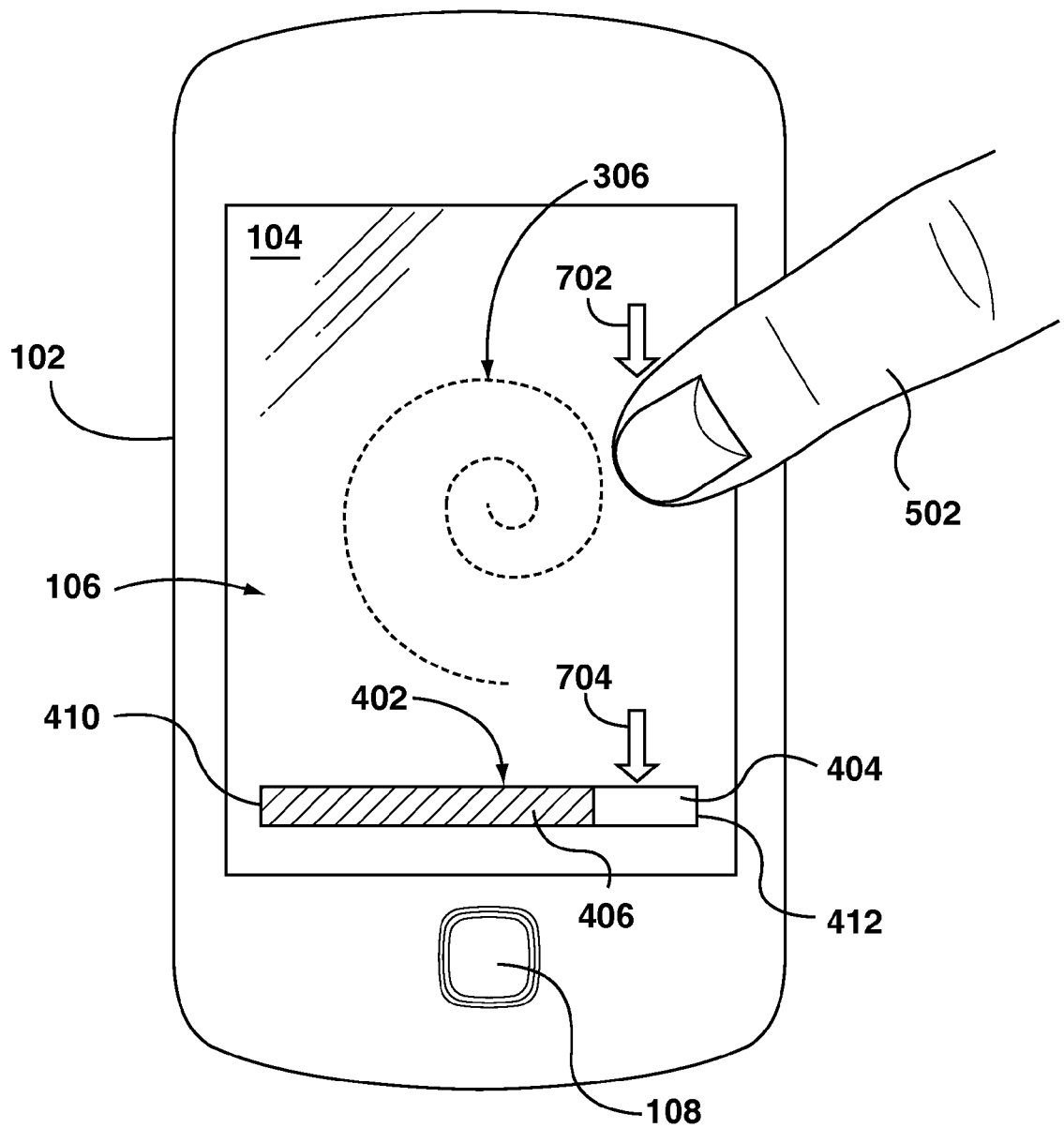
FIG. 7 is a top view of a communication device receiving input.

In one or more embodiments, receiving the input includes receiving a movement of the touch on the touchscreen display, and outputting the progress indicator 402 includes displaying the progress indicator 402 and moving the progress indicator 402 in a movement that is dependent on the movement of the touch. It is understood that the touchscreen display can detect and measure the movement of a touch it receives and can store the detected movement (e.g. direction, speed and/or pressure of the touch) in memory. For example, in accordance with the embodiment illustrated in FIG. 7, a finger 502 is touching the touchscreen display and has moved or dragged along the surface 104 across the arrow identified at 702. The communication device 102 receives this movement as input to the touchscreen display and in response causes the progress indicator 402 to move in a dependent manner on the display 106 (as shown by the arrow identified at 704). For example, the finger 502 (or other input) can move across the touchscreen display with a certain movement which can cause the progress indicator 402 to move across the display 106 in a corresponding movement.

In one or more embodiments, in response to a first type of input received at the communication device 102 during the boot sequence, the processor 238 causes the animation 306 to disappear from the display 106 and in response to a second type of input received at the communication device 102 during the boot sequence, the processor 238 causes the animation 306 to fade out from the display. The first type of input can be different from the second type of input. For example, the first type of input is a touch on a touchscreen display with one finger while the second type of input is a touch with two fingers on the touchscreen display. By way of further example, the first type of input can be an audible command and the second type of input can be a button selection. However, in response to receiving either or both the first type of input and the second type of input during the boot sequence, the processor 238 can cause the progress indicator 402 to be output on the display 106 or otherwise.

In another embodiment, the input to the communication device 102 during the boot sequence can comprise a predetermined gesture. For example, the communication device 102 can compare a received gesture (e.g. a hand movement) that corresponds to a specific predetermined gesture and this will cause the communication device 102 to output the progress indicator 402 on the display 106 and to fade out or remove the animation 306 (if any) from the display 106.

Example Method of Indicating the Progress of a Boot Sequence

Figure 8:
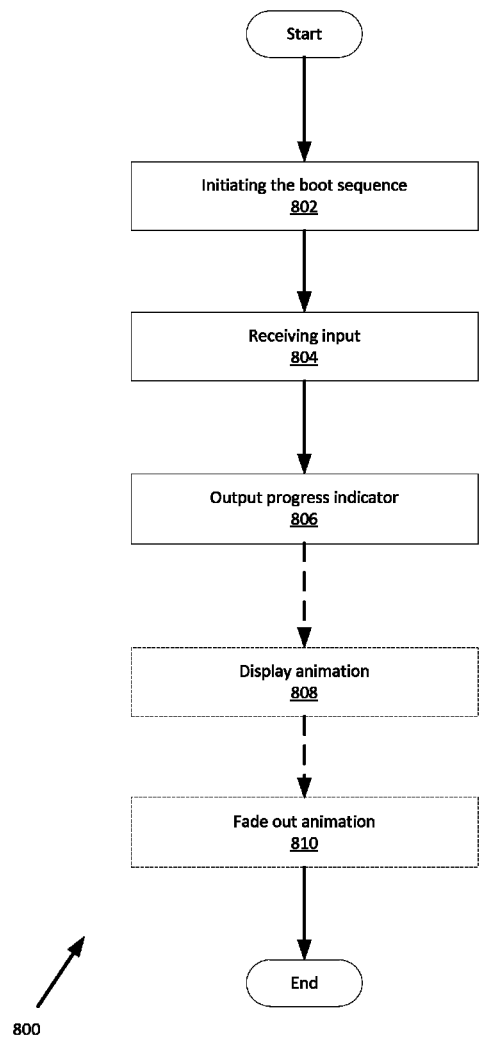
FIG. 8 is a flowchart of a method of indicating the progress of a boot sequence on a communication device.

FIG. 8 is a flowchart illustrating at 800 an example embodiment of a method of indicating the progress of a boot sequence on a communication device 102.

At 802 the boot sequence is initiated at the communication device 102. For example, the boot sequence can be initiated when the communication device 102 is switched on or if it receives a new battery. Upon being initiated the boot sequence may be run (or be executed by the processor 238) on the communication device 102. As noted above, the boot sequence requires an amount of time to complete in order to initialize the operating system and other components of the communication device 102 to be ready for normal operation.

At 804, input is received at the communication device 102 during the boot sequence. In other words, input is received at the communication device 102 during the time when the boot sequence is operating or running. As noted above, the input can be (among other things) a touch on a location of a touchscreen display or can be a button selection or an audible command. In a further embodiment receiving input at the communication device 102 includes receiving a predetermined gesture. For example, communication device 102 can detect a gesture and can store the detection in memory. The processor 238 may then compare the detected gesture with one or more predefined gestures stored in memory, with at least one of the predefined gestures associated with an action. If there is a match between the predefined gesture and the detected gesture the action associated with the predefined gesture will be performed.

In one or more embodiments, the input is received for a duration of time. For example, the input can be a touch on the touchscreen display and the duration can be the amount of time the touch remains on the touchscreen display. By way of further example, the input can comprise a first input and a second input, with the first input being the start of the duration of time and the second input being the ending of the duration of time. The first input and second input can be button selections, audible commands, gestures, or other types of input for example.

At 806, a progress indicator 402 indicating the progress of the boot sequence is output from the communication device 102 in response to receiving the input. As noted, the output can be (among other things) a display or an audible output. The output can be caused or directed by the processor 238 executing instructions stored in memory. In an embodiment, the input includes a gesture detected by the communication device 102. The detected gesture is compared to one or more predefined gestures stored in memory and if there is a match, then the action associated with the matched predefined gesture is performed by the processor 238. For example, the action may be to output the progress indicator 402 on the display 106.

Outputting the progress indicator 402 can comprise displaying the progress indicator 402 on a location on the display 106 of the communication device 102. For example, the location for displaying the progress indicator 402 can be a predetermined location (e.g. stored in memory associated with the communication device 102) on the display 106. Or, alternatively, the location on the display where the progress indicator 402 is output can be dynamically selected. For example, the location can be selected after input is received at the communication device 102. In a further embodiment, the location of the output of the progress indicator 402 on the display 106 is dependent on the location of a touch on the touchscreen (or other input to the communication device 102). In yet another embodiment, the location of the output of the progress indicator 402 on the display 106 is adjacent the location of the touch on the touchscreen. For example, the location of the touch on the touchscreen will be detected by the processor 238 and the processor 238 will then cause the progress indicator 402 to be output at a location on the display 106 adjacent to the detected touch.

The method of indicating the progress of a boot sequence on a communication device 102 can also comprise measuring the orientation of the communication device 102 and outputting or displaying the progress indicator 402 in a location on the display 106 that is above the detected location of a touch on the touchscreen display. For example, the orientation of the communication device 102 can be measured or detected by the orientation module.

In accordance with one or more embodiments, the input received at the communication device 102 includes a movement of a touch on a touchscreen. For example, the movement of the touch can be detected at the touchscreen display. In such an embodiment, the output of the progress indicator 402 includes moving the progress indicator 402 in a movement that is dependent on the detected movement of the touch. For example, the processor 238 can cause the progress indicator 402 to move based on the detected movement of the touch.

In one or more embodiments, the progress indicator 402 is output for an output time period. In other words the output time period can be the amount of time that elapses while the progress indicator 402 is being output. For example, the progress indicator 402 can be output on the display 106 for the output time period. In accordance with a further embodiment, outputting can comprise outputting the progress indicator 402 for an output time period dependent on the duration of time during which the input is received. In yet a further embodiment, outputting the progress indicator 402 can comprise outputting one or more of a visual, audible or vibrational output.

Optionally, shown at 808, the animation 306 is displayed for at least a portion of the duration of the boot sequence. For example, the animation 306 can be displayed only at the beginning portion of the boot sequence, only at the end of the boot sequence, or for the entire duration of the boot sequence.

In one or more embodiments, the animation 306 can be an audible message (e.g. a song) or another type or format of output.

Optionally, shown at 810, the animation 306 fades out during the output time period. For example, when the input is received the processor 238 causes the animation 306 to change from being prominently output on display 106 to being output less prominently on the display 106. For example, during the output time period the progress indicator 402 can be output on the display 106 overtop of and more prominently than the animation 306. When the output time period elapses and the progress indicator 402 is no longer being output, the processor 238 can cause the animation 306 to fade in or to become more prominently output on the display 106. By way of further example, the animation 306 can disappear for the output time period and reappear when the output time period has elapsed (and when the progress indicator 402 is no longer being output). In yet a further example, the fading out of the animation 306 during the output time period can be a partial fading out or a slight dimming where the animation 306 become relatively darker when the relatively brighter progress indicator 402 is visible overtop of the animation 306.

It is understood that the communication device 102 can be an electronic device such as a computer, a handheld computer, a mobile device, a mobile phone, a cellular phone, a personal digital assistant, a tablet computer, a desktop computer, a wearable computer, a personal computer or a smart phone.

While the present application is primarily described in terms of methods, a person of ordinary skill in the art will understand that the present application is also directed to various apparatus' such as communication device 102 including a mobile communications device. The communication device 102 includes components for performing at least some of the aspects and features of the described methods, which may be by way of hardware components (such as the memory 224 and/or the processor 238), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

One or more embodiments have been described by way of example. It will be apparent to persons skilled in the art that a number of variations and modifications can be made without departing from the scope of what is defined in the claims.

What is claimed is the following:

1. A method of indicating the progress of a boot sequence on a communication device, the method comprising:
   initiating the boot sequence;
   receiving input at the communication device during the boot sequence; and,
   in response to receiving input, displaying a progress indicator indicating the progress of the boot sequence on a display of the communication device, wherein receiving input comprises receiving input for a duration of time and wherein the progress indicator is displayed for an output time period proportional to the duration of time.

2. The method of claim 1, wherein receiving input comprises receiving a touch on a location of a touchscreen display on the communication device.

3. The method of claim 2, wherein the location on the display where the progress indicator is output is dependent on the location of the touch.

4. The method of claim 3, wherein the location on the display where the progress indicator is output is adjacent the location of the touch.

5. The method of claim 4, further comprising measuring an orientation of the communication device and wherein the location on the display where the progress indicator is output is above the location of the touch.

6. The method of claim 5, wherein receiving the input further comprises receiving a movement of the touch, and wherein outputting the progress indicator further comprises moving the progress indicator in a movement that is dependent on the movement of the touch.

7. The method of claim 1, further comprising:
   displaying an animation on the display for at least a portion of the duration of the boot sequence; and,
   fading out the animation during the output time period.

8. The method of claim 1, wherein receiving input at the device comprises receiving a predetermined gesture.

9. The method of claim 1, wherein outputting the progress indicator comprises outputting one or more of a visual, audible and vibrational output.

10. A communication device comprising:
a memory storing boot sequence instructions;
an input interface;
a processor coupled to the input interface to receive input and coupled to memory to execute the boot sequence instructions to configure the processor to:
receive input at the input interface; and,
in response to receiving input, display a progress indicator indicating the progress of the boot sequence on a display of the communication device, wherein receiving input comprises receiving input for a duration of time and wherein the progress indicator is displayed for an output time period proportional to the duration of time.

11. The communication device of claim 10, wherein the input interface comprises a touchscreen display.

12. The communication device of claim 11, wherein the display comprises the touchscreen display.

13. The communication device of claim 12, wherein the processor is further configured to output the progress indicator on a location on the display that is dependent on the location of the input at the touchscreen display.

14. The communication device of claim 10, wherein the processor is further configured to output an animation for at least a portion of the duration of the boot sequence, and to fade out the animation for at least a portion of the output time period.

15. The communication device of claim 12, further comprising an orientation module coupled to the processor to measure the orientation of the communication device, and wherein the processor is further configured to output the progress indicator on a location on the display that is above the location of the input on the touchscreen display.

16. A non-transitory computer readable storage medium comprising computer-executable instructions which, when executed, cause a processor to:
receive input; and,
in response to receiving input, display a progress indicator indicating the progress of a boot sequence on a display of a communication device, wherein receiving input comprises receiving input for a duration of time and wherein the progress indicator is displayed for an output time period proportional to the duration of time.

* * * * *